(12) United States Patent
Kawamura et al.

(10) Patent No.: US 9,488,420 B2
(45) Date of Patent: Nov. 8, 2016

(54) HEAT CONDUCTING SHEET

(71) Applicant: PANASONIC CORPORATION, Osaka (JP)

(72) Inventors: Norihiro Kawamura, Hokkaido (JP); Takahiro Senshu, Hokkaido (JP); Kazuhiko Kubo, Hokkaido (JP); Keiji Kawajiri, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 34 days.

(21) Appl. No.: 14/385,971

(22) PCT Filed: Dec. 10, 2013

(86) PCT No.: PCT/JP2013/007253
§ 371 (c)(1),
(2) Date: Sep. 17, 2014

(87) PCT Pub. No.: WO2014/097575
PCT Pub. Date: Jun. 26, 2014

(65) Prior Publication Data
US 2015/0086780 A1 Mar. 26, 2015

(30) Foreign Application Priority Data
Dec. 17, 2012 (JP) .................................. 2012-274291

(51) Int. Cl.
*F28F 21/02* (2006.01)
*F28F 21/06* (2006.01)
*C09J 133/04* (2006.01)
*C09J 7/02* (2006.01)

(52) U.S. Cl.
CPC ................ *F28F 21/02* (2013.01); *C09J 7/026* (2013.01); *C09J 133/04* (2013.01); *F28F 21/06* (2013.01);
(Continued)

(58) Field of Classification Search
CPC ........ B32B 9/00; B32B 27/00; C09J 133/04; C09J 7/026; C09J 2203/326; C09J 2433/00; F28F 21/02; F28F 21/06; F28F 2013/006; F28F 13/00; Y10T 428/24752; Y10T 428/30; Y10T 428/149; Y10T 428/2848; Y10T 428/14; Y10T 428/1471; Y10T 428/28; Y10T 428/24793; Y10T 428/15; Y10T 428/24777; Y10T 428/2486; Y10T 428/24851; Y10T 428/24802; Y10T 428/23; Y10T 428/239; H01L 23/3733; H01L 23/3735; H01L 2924/0002; H01L 2924/00
See application file for complete search history.

(56) References Cited

U.S. PATENT DOCUMENTS 4,755,249 A * 7/1988 DeGree ............... H01L 21/4803
156/252
2008/0236806 A1 10/2008 Ohta et al.
2010/0129582 A1* 5/2010 Nagashima ............... B32B 7/06
428/40.1

FOREIGN PATENT DOCUMENTS

CN 101277601 10/2008
JP 7-36172 U 7/1995
(Continued)

OTHER PUBLICATIONS

International Search Report issued in International Application No. PCT/JP2013/007253, mailed Mar. 25, 2014, with English translation.
(Continued)

*Primary Examiner* — Patricia L Nordmeyer
(74) *Attorney, Agent, or Firm* — McDermott Will & Emery LLP

(57) ABSTRACT

A heat conducting sheet includes a first sheet having heat conductivity, a bonding layer disposed on a part of a first face of the first sheet, and a backing separator disposed on the first face entirely. The backing separator has slight adhesion, so that the first sheet can stick to the backing separator. Bonding force between the first sheet and the bonding layer is greater than bonding force between the backing separator and the bonding layer.

7 Claims, 3 Drawing Sheets

(52) U.S. Cl.
    CPC ....... *C09J 2203/326* (2013.01); *C09J 2433/00* (2013.01); *Y10T 428/14* (2015.01); *Y10T 428/2848* (2015.01)

(56) References Cited

FOREIGN PATENT DOCUMENTS

| JP | 2002-319653 A | 10/2002 |
|---|---|---|
| JP | 2003-347712 A | 12/2003 |
| JP | 2006-186026 A | 7/2006 |
| JP | 2007-283509 A | 11/2007 |
| JP | 2008-251746 A | 10/2008 |
| JP | 2010-254979 A | 11/2010 |

OTHER PUBLICATIONS

English Translation of Chinese Search Report dated Mar. 16, 2016 for the related Chinese Patent Application No. 201380023012.X.

* cited by examiner

HEAT CONDUCTING SHEET

RELATED APPLICATIONS

This application is the U.S. National Phase under 35 U.S.C. §371 of International Application No. PCT/JP2013/007253, filed on Dec. 10, 2013, which in turn claims the benefit of Japanese Application No. 2012-274291, filed on Dec. 17, 2012, the disclosures of which are incorporated by reference herein.

TECHNICAL FIELD

The present invention relates to heat conducting sheets to be used in a variety of electronic apparatuses such as portable phones.

BACKGROUND ART

Various electronic apparatuses have been rapidly improved in functions and processing capabilities thereof in recent years. Due to the improvement, heat generation from electronic components including semiconductors used in these electronic devices tends to be increased. As a result, a heat spot that encounters a local high temperature is produced. When the heat spot is produced near a display device such as a liquid crystal display (LCD), the display performance of the display device may degrade. To avoid this problem, a high heat conducting sheet such as a graphite sheet is bonded to a liquid crystal panel in order to uniform the heat distribution as an countermeasure against the heat spot.

In such a high heat conducting sheet, a bonding layer is provided on the sheet entirely, so that the solid bonding of this high heat conducting sheet to, for instance, an entire reflective sheet disposed on a rear side of the liquid crystal panel tends to cause warps or distortions on the reflective sheet.

During the production and transportation of the high heat-conducting sheet, a backing separator is bonded to a surface of the high heat-conducting sheet in order to protect the bonding layer. The surface is provided with the bonding layer thereon. A peel-off layer is disposed on a surface of the backing separator. The surface is bonded to the bonding layer. Therefore, the backing separator can be peeled off with ease from the backing separator.

PLT 1 is known as one of related art information to the present information.

CITATION LIST

Patent Literature

PTL 1: Unexamined Japanese Patent Application Publication No. 2010-254979

SUMMARY OF INVENTION

When the bonding layer is formed on a part of the high heat-conducting sheet, warps or distortions are hardly produced when the high heat-conducting sheet is stuck to the reflective sheet. However, a partial and smaller bonding layer, namely a smaller area of the bonding layer, will cause weaker holding force between the high heat-conducting sheet and the backing separator because they are fixed together only by the bonding layer. Thereby, when the high heat-conducting sheet is processed into a given shape, the weak holding force tends to invite dislocation. To overcome this problem, the present invention aims to provide a heat conducting sheet that does not produce warps or distortions on an object to which this sheet is bonded. This heat conducting sheet is also easily processed into a predetermined shape.

The heat conducting sheet of the present invention has a first sheet having heat conductivity, a bonding layer formed on a part of a first face of the first sheet, and a backing separator formed on the first face entirely and having slight adhesion. The first sheet and the backing separator can be stuck together. The bonding force between the first sheet and the bonding layer is greater than the bonding force between the backing separator and the bonding layer.

Even if the first sheet and the backing separator are stuck together with small fixing force produced by the bonding layer of a small area, the structure discussed above allows the backing separator to retain the first sheet due to its slight adhesion even at bare portions of the first sheet where no bonding layers are formed. As a result, the first sheet can be processed into a predetermined shape free from dislocation. When the first sheet is stuck to a reflective sheet of the liquid crystal panel, warps or distortions are hardly produced because they are bonded together only in parts.

DESCRIPTION OF EMBODIMENTS

Heat conducting sheet 16 in accordance with the embodiment of the present invention is demonstrated hereinafter with reference to the accompanying drawings.

Figure 1:
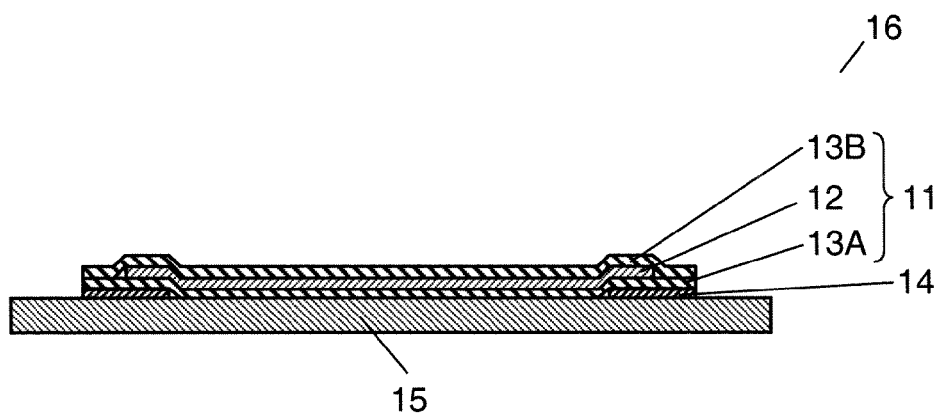
FIG. 1 is a sectional view of a heat conducting sheet in accordance with an embodiment of the present invention.
Figure 2:
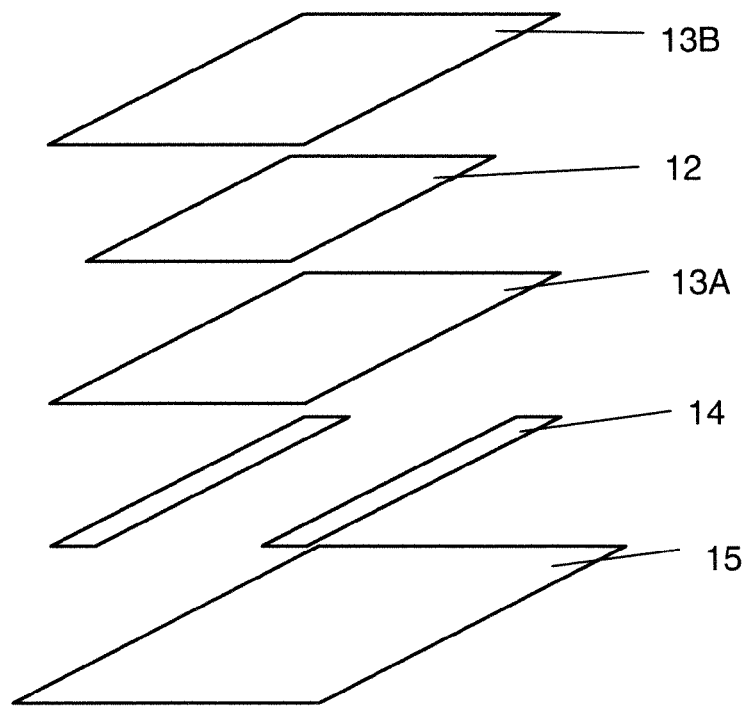
FIG. 2 is an exploded perspective view of the heat conducting sheet shown in FIG. 1.

FIGS. 1 and 2 are a sectional view and an exploded perspective view of heat conducting sheet 16, respectively. Heat conducting sheet 16 includes first sheet 11, bonding layer 14, and backing separator 15. First sheet 11 is formed of, for instance, graphite sheet 12 having a thickness of approx. 25 μm, and insulating sheets 13A, 13B bonded to both the faces of first sheet 11. Each of insulating sheets 13A and 13B is made of polyethylene terephthalate (PET) having a thickness of approx. 10 μm and acrylic adhesive material. First sheet 11 has excellent heat conductivity in a planar direction due to graphite sheet 12, and insulating sheets 13A, 13B bonded to the both faces thereof give first sheet 11 insulation properties.

First sheet 11 is, for instance, rectangular of 11 cm×6 cm, and bonding layer 14 having a width, for instance, of approx. 2 mm is formed along the two long sides of first sheet 11. Bonding layer 14 can be provided to the four corners of first sheet 11 instead of along the two long sides.

Bonding layer 14 is formed of PET sheet and acrylic adhesive material applied to both faces of the PET sheet, and has a thickness of, for instance, approx. 10 μm. Backing separator 15 is stuck to the entire face of first sheet 11 where bonding layer 14 is provided. Backing separator 15 is formed of a PET sheet and adhesive having slight adhesion and made of silicone-based adhesive material formed on a first face of the PET sheet. This first face, on which the adhesive of slight adhesion is formed, is stuck to first sheet 11. The slight adhesion in this context refers to an adhesive that gives an object member appropriate adhesion, and when the adhesive is removed, no sticky matter is left on the object member.

Since bonding layer 14 employs acrylic adhesive material and backing separator 15 employs silicone-based adhesive material, these adhesive materials lie between the PET sheet of bonding layer 14 and the PET sheet of backing separator 15, and only the acrylic adhesive material lies between the PET sheet of bonding layer 14 and the PET sheet of insulating sheet 13A of first sheet 11. As a result, the bonding force between first sheet 11 and bonding layer 14 is greater than the bonding force between backing separator 15 and bonding layer 14. Therefore, even when bonding layer 14 having a smaller area is used, this structure allows preventing the bonding layer 14 from peeling off first sheet 11 when backing separator 15 is removed.

Use of a regular backing separator is able to obtain small bonding force between a bonding layer and the regular backing separator; however, since the regular backing separator does not have slight adhesion, dislocation occurs on the first sheet at places where no bonding layers are formed because these places cannot be fixed to and become unstable due to no bonding layer.

In the case of employing an adhesive tape of slight adhesion, to which regular acrylic adhesive material is applied, for the backing separator, bare portions where no bonding layers are formed on the first sheet are fixed to the adhesive tape due to the presence of the slight adhesion; however, the portions with the bonding layers on the first sheet are strongly bonded to the adhesive tape of slight adhesion. The bonding force between the backing separator and the bonding layer is greater than the bonding force between the bonding layer and the first sheet. Therefore, the bonding layer is peeled off the first sheet when the backing separator is removed, so that the first sheet becomes useless.

In this embodiment, silicone-based adhesive material of slight adhesion is used as an adhesive member of the adhesive tape of slight adhesion, and this adhesive tape is used for backing separator 15. This structure achieves smaller bonding force between bonding layer 14 and backing separator 15. The bare portions where no bonding layers 14 are formed on first sheet 11 are fixed to the adhesive tape by the adhesion of the adhesive tape of slight adhesion. As a result, heat conducting sheet 16 can be processed into a predetermined shape with ease free from warps or distortions on the object member to which sheet 16 is stuck.

Figure 3:
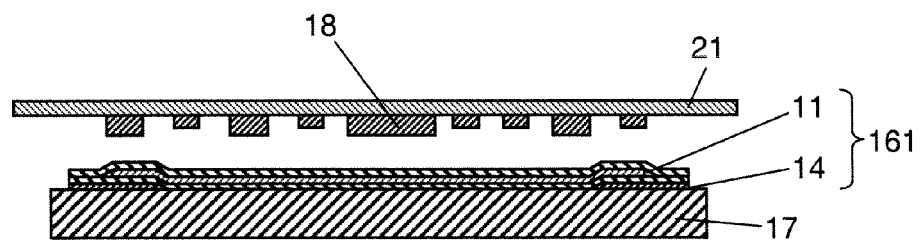
FIG. 3 is a sectional view of an apparatus in which the heat conducting sheet shown in FIG. 1 is employed.

FIG. 3 is a sectional view of an apparatus to which heat conducting sheet 161 is stuck. Heat conducting sheet 161 is formed by removing the backing separator 15 from heat conducting sheet 16. Heat conducting sheet 161, from which the backing separator has been already removed, is stuck to a reflective sheet (not shown) disposed on a rear face of liquid crystal panel 17 via bonding layer 14. Heat generating components 18 are disposed opposite to heat conducting sheet 161. The area of bonding layer 14 is as small as not greater than 10% of heat conducting sheet 161, so that little stress is applied to the reflective sheet that is stuck to the heat conducting sheet 161. No warps or distortions can be thus produced on the reflective sheet. Since graphite sheet 12 has high heat-conductivity in the plane direction, the heat generated from heat generating components 18 travels to heat conducting sheet 161, and then dissipates along the plane direction due to the presence of graphite sheet 12. As a result, this structure prevents the occurrence of heat spots.

Next, a method for manufacturing heat conducting sheet 16 is demonstrated with reference to FIG. 4A-FIG. 4M. FIGS. 4A, 4C, 4E, 4G, 4J, and 4L show parts of FIG. 4B, 4D, 4F, 4H, 4K, and 4M, respectively.

Figure 4A:
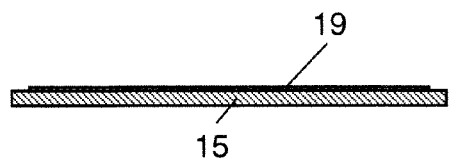
FIG. 4A is a sectional view of a heat conducting sheet undergoing a manufacturing process done by a manufacturing method of the heat conducting sheet shown in FIG. 1.
Figure 4B:
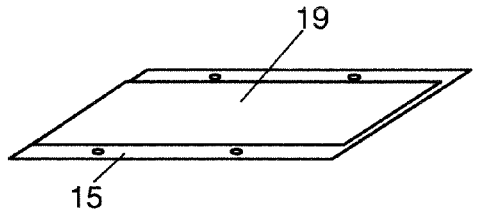
FIG. 4B is a perspective view of the heat conducting sheet shown in FIG. 4A and undergoing the manufacturing process.

First, as FIGS. 4A and 4B show, bonding sheet 19 is stuck onto a top face of backing separator 15 in order to form a bonding layer. Backing separator 15 is made of a PET sheet and an adhesive member of slight adhesion disposed on a top face of the PET sheet. This adhesive member is made of silicone-based adhesive material. Backing separator 15 has a thickness of, for instance, approx. 70 μm. Bonding sheet 19 is made of a PET sheet and acrylic adhesive material disposed on both the faces of the PET sheet. Bonding sheet 19 has a thickness of, for instance, approx. 10 μm.

Figure 4C:
FIG. 4C is a sectional view showing a step, following what is shown in FIG. 4A, of the manufacturing process of the heat conducting sheet.
Figure 4D:
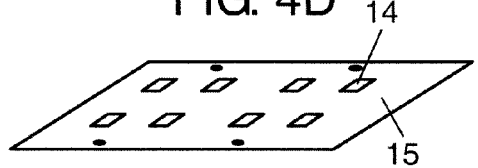
FIG. 4D is a perspective view of the heat conducting sheet shown in FIG. 4C and undergoing the manufacturing process.

Next, bonding sheet 19 is cut into a predetermined shape with a metal mold, and a useless portion is removed, thereby forming bonding layer 14 as shown in FIGS. 4C and 4D.

Figure 4E:
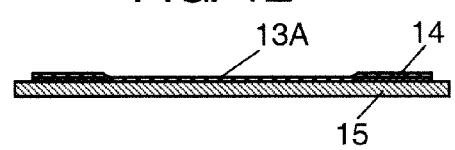
FIG. 4E is a sectional view showing a step, following what is shown in FIG. 4C, of the manufacturing process of the heat conducting sheet.
Figure 4F:
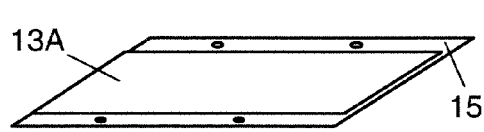
FIG. 4F is a perspective view of the heat conducting sheet shown in FIG. 4E and undergoing the manufacturing process.

Then as FIGS. 4E and 4F show, a PET sheet having a thickness of, for instance, 10 μm is stuck to backing separator 15 on the face where bonding layer 14 is formed. The PET sheet is provided with insulating sheet 13A having an adhesive member on its top face.

Insulating sheet 13A is thinner than backing separator 15, so that insulating sheet 13A is deformed along steps formed by bonding layer 14. In a bare portion, where no bonding layer 14 is formed, the PET sheet of insulating sheet 13A is bonded to the adhesive member of backing separator 15.

Figure 4G:
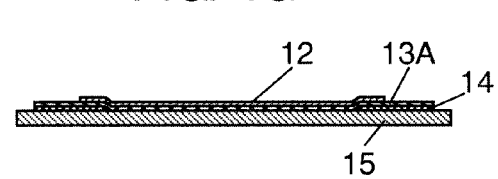
FIG. 4G is a sectional view showing a step, following what is shown in FIG. 4E, of the manufacturing process of the heat conducting sheet.
Figure 4H:
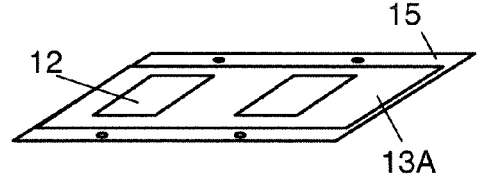
FIG. 4H is a perspective view of the heat conducting sheet shown in FIG. 4G and undergoing the manufacturing process.

Then as FIGS. 4G and 4H show, graphite sheet 12 punched into a predetermined shape is stuck onto insulating sheet 13A.

Figure 4J:
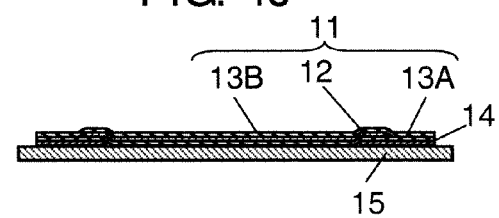
FIG. 4J is a sectional view showing a step, following what is shown in FIG. 4G, of the manufacturing process of the heat conducting sheet.
Figure 4K:
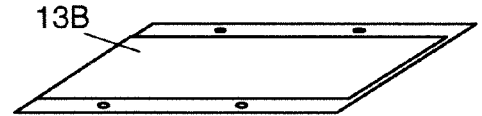
FIG. 4K is a perspective view of the heat conducting sheet shown in FIG. 4J and undergoing the manufacturing process.

Next, as FIGS. 4J and 4K show, insulating sheet 13B is stuck onto graphite sheet 12 in a manner that the adhesive member of insulating sheet 13B faces down.

Figure 4L:
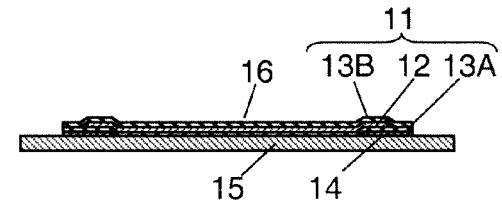
FIG. 4L is a sectional view showing a step, following what is shown in FIG. 4J, of the manufacturing process of the heat conducting sheet.
Figure 4M:
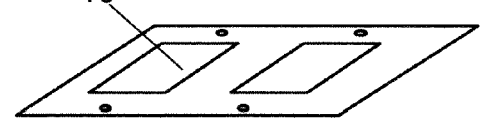
FIG. 4M is a perspective view of the heat conducting sheet shown in FIG. 4L.

Then first sheet 11 and the bonding layer 14 are cut into a predetermined shape with a metal mold, and useless portions are removed, whereby heat conducting sheet 16 as shown in FIGS. 4L and 4M is completed.

A backing separator is regularly applied with mold release agent on its face to be stuck in order to peel off. In the case of providing the heat conducting sheet entirely with the bonding layer, the sheet can be cut with the metal mold due to the bonding force of the bonding layer. However, as demonstrated in this embodiment, in the case of adopting the bonding layer having an extremely smaller area, the first sheet cannot be retained sufficiently, so that the graphite sheet is possibly displaced when it is stuck to a predetermined place, or the cutting position is tend to be displaced.

Heat conducting sheet 16, on the other hand, employs backing separator 15 of slight adhesion, and gives the greater bonding force between first sheet 11 and backing separator 15 than the bonding force between backing separator 15 and bonding layer 14. This structure allows first sheet 11 to be retained chiefly by backing separator 15, so that heat conducting sheet 16 can be formed into a complicated shape.

INDUSTRIAL APPLICABILITY

The heat conducting sheet of the present invention does not produce warps or distortions on an object matter to which this sheet is stuck, and the sheet can be processed into a predetermined shape with ease. The heat conducting sheet is useful for industrial products.

REFERENCE MARKS IN THE DRAWINGS

11 first sheet
12 graphite sheet
13A, 13B insulating sheet
14 bonding layer
15 backing separator
16 heat conducting sheet
17 liquid crystal panel
18 heat generating component
19 bonding sheet
161 heat conducting sheet

The invention claimed is:
1. A heat conducting sheet comprising:
a first sheet having heat conductivity;
a bonding layer disposed on a part of a first face of the first sheet; and
a backing separator disposed on the first face entirely,
wherein the backing separator includes a polyethylene terephthalate (PET) sheet and an adhesive material formed on the PET sheet, the adhesive material is between the backing separator and the first sheet, the first sheet can stick to the backing separator due to the adhesive material of the backing separator, and bonding force between the first sheet and the bonding layer is greater than bonding force between the backing separator and the bonding layer.

2. The heat conducting sheet according to claim 1, wherein bonding force between the first sheet and the backing separator is greater than the bonding force between the backing separator and the bonding layer.

3. The heat conducting sheet according to claim 1, wherein the first sheet is formed of a graphite sheet of which both faces are stuck with insulating sheets, respectively, the bonding layer is formed of acrylic adhesive material, and the backing separator is formed of silicone-based adhesive material.

4. The heat conducting sheet according to claim 1, wherein the first sheet has a long side and a short side.

5. The heat conducting sheet according to claim 4, wherein a space is formed between the first sheet and the backing separator; and
wherein a length of the bonding layer along a direction of the short side is longer than a length of the space along the direction of the short side.

6. The heat conducting sheet according to claim 4, wherein the bonding layer is disposed on a first end of the short side of the first sheet and extends along a direction of the long side.

7. The heat conducting sheet according to claim 6, further comprising: a second bonding layer disposed on a second end opposite the first end of the first sheet.

* * * * *